Patented Aug. 24, 1943

2,327,376

UNITED STATES PATENT OFFICE 2,327,376

HYDROGENATION PRODUCTS OF $\Delta^6$-ESTRONE AND METHOD OF PREPARING SAME

Erwin Schwenk, Montclair, N. J., assignor to Schering Corporation, Bloomfield, N. J., a corporation of New Jersey No Drawing. Application February 14, 1940, Serial No. 318,918

6 Claims. (Cl. 260—397.5)

The present invention relates to the partial hydrogenation products of $\Delta^6$-estrone, and to a method of producing the same.

It is the general object of the invention to produce partial reduction products of $\Delta^6$-estrone in which the phenolic character of the first ring is preserved.

I have found that $\Delta^6$-estrone can under certain conditions be partially hydrogenated to yield $\Delta^6$-estradiol, and can also be more highly hydrogenated to form estradiol, these products being physiologically active and serving also as intermediates for the production of other physiologically active compounds.

I have found that it is possible to prepare the known physiologically highly effective alpha estradiol and its isomer, the beta estradiol, and also the hitherto unknown $\Delta^6$-estradiol, by starting with the easily obtainable $\Delta^6$-estrone. This compound may be prepared from 6-keto-estrone (see my copending application, Serial No. 273,416, filed May 13, 1939, entitled "Oxygenated estrogenic hormones and method of preparing same") by hydrogenating and splitting out water from this compound, or it may be prepared from other starting materials, as, for instance, equilin. I have found that it is possible to introduce two or four hydrogen atoms in $\Delta^6$-estrone in such a way that only the keto-group in 17 position, or such keto group and the double bond in ring B are hydrogenated. When two hydrogen atoms are added, the resulting compound is the $\Delta^6$-estradiol which exists in two isomeric forms. The substance shows estrogenic activity when tested by the Allen-Doisy test. This reduction may be carried out by introducing two hydrogen atoms into the molecule with the aid of the Meerwein-Ponndorf reaction, that is, by heating the compound or its 3-derivatives such as esters or ethers with an alcohol and a metal alcoholate, as with isopropyl alcohol and aluminum isopropylate. The isopropyl alcohol is oxidized to acetone, while the starting compound is reduced to the secondary alcohol. Another method of manufacture is to dissolve the compound in alkali solution and add a finely divided metal or metal alloy, such as zinc, aluminum, and the so-called Raney alloys, for example, nickel-aluminum alloy with a content of 50% aluminum. The hydrogen which is evolved acts to reduce the keto group only, and the double bond is not attacked. Finally, catalytic reduction may be used, metal catalysts being employed under such mild conditions (both the nature of the catalyst and the temperature and pressure being taken into consideration) that only the keto group, or at most the keto group and the $\Delta^6$ double bond are hydrogenated. Thus where noble metal catalysts are used, such as metals of the platinum group (for example, platinum and palladium), or if the reaction is carried out under higher temperatures and pressure, in the case of a nickel catalyst, 4 atoms of hydrogen are absorbed and the alpha estradiol is immediately obtained.

The following examples will serve to illustrate in detail several methods of carrying out the invention, but are not intended to indicate the scope of the invention:

Example 1

1 gram of $\Delta^6$-estrone of a M. P. 265° C. and a rotation of +150° is dissolved in 200 cc. of 10% potassium hydroxide solution, and 5 grams of a nickel-aluminum alloy in finely powdered form are added in small portions to the well-stirred solution. After the powder has all been introduced, the reaction mixture is heated on the water bath and stirred for ½ hour more. It is then filtered from the nickel, and acidified with hydrochloric acid to slight congo reaction. After cooling, the new compound crystallizes out in beautiful crystals. The melting point of the product is not very sharp, the product melting with decomposition. When it is dissolved in sulfuric acid, a yellow coloration is obtained.

Example 2

1 gram of $\Delta^6$-estrone is dissolved in a mixture of 100 cc. of isopropyl alcohol and 20 grams of aluminum isopropylate added. The mixture is slowly distilled until no more acetone comes over. The reaction mixture is thereupon distilled with steam, then acidified with hydrochloric acid and shaken out with ether. The ether solution is dried and then evaporated. The residue is recrystallized from dilute alcohol. The $\Delta^6$-estradiol is obtained in beautiful white crystals with the same properties as the product of Example 1.

Example 3

1 gram of $\Delta^6$-estrone is dissolved in alcohol, 200 mgm. of a platinum catalyst are added and the solution shaken with hydrogen at room temperature. 4 atoms of hydrogen are absorbed. After filtration from the catalyst, the solution is precipitated by addition of water, and the substance filtered. A mixture of alpha and beta estradiol is obtained, melting at 172° C., which may be separated into alpha and beta estradiol by known methods, as by fractional distillation under vacuum.

The $\Delta^6$-estradiol, obtained, for instance, according to Examples 1 and 2, can be partially hydrogenated to estradiol by subjecting the same to hydrogenating agents capable of saturating double bonds, such as catalytically activated hydrogen, as in Example 3.

In place of the $\Delta^6$-estrone, the corresponding 3-ester, for example, the acetate, benzoate, or propionate, can be employed, and will yield a corresponding 3-ester of $\Delta^6$-estradiol. Similarly, the 3-ethers, such as the methyl and ethyl ethers, can be employed as the starting materials. The 3-substitution products of the $\Delta^6$-estradiol can be recovered and utilized as such or may be hydrolyzed to produce the free $\Delta^6$-estradiol (3, 17).

The free $\Delta^6$-estradiol and likewise the 3-substituted-$\Delta^6$-estradiol, can be acylated by known means as by treating with the anhydrides and chlorides of the acids to be introduced, and yield diesters, thereby showing that the product is a diol. The 17-mono-esters can likewise be prepared by methods already known in the art, as by producing mixed esters in which the 3-acyl group is more readily hydrolyzable than the 17-ester group, or by direct introduction of the acyl residue into the 17-position of the diol. In this manner the 17-propionate, for example, and likewise the benzoate, can be produced.

The sodium compounds of the $\Delta^6$-estradiol produced in accordance with the procedures set forth in Example 1 can themselves be isolated as such, either by evaporation of the solution, or by salting out by the addition of soluble salts.

I claim:

1. The method of producing unsaturated diols of the estrane series which comprises subjecting $\Delta^6$-estrone to the action of an alcohol in the presence of a metal alcoholate, and recovering the $\Delta^6$-estradiol so produced.

2. The method of producing unsaturated diols of the estrane series which comprises subjecting $\Delta^6$-estrone to the action of an alcohol in the presence of an aluminum alcoholate, and recovering the $\Delta^6$-estradiol so produced.

3. A compound of the group consisting of $\Delta^6$-estradiol and its 3-substitution products capable of conversion to $\Delta^6$-estradiol with the aid of hydrolysis.

4. 3-acyl-$\Delta^6$-estradiol-(3, 17).

5. $\Delta^6$-estradiol.

6. An alkali metal compound of $\Delta^6$-estradiol.

ERWIN SCHWENK.